July 15, 1958

TAKEO NOJIMA 2,843,426

VEHICLE WHEEL

Filed April 12, 1955

INVENTOR:
TAKEO NOJIMA

BY
Richardson, David and Nardon
ATTORNEYS.

United States Patent Office 2,843,426
Patented July 15, 1958

2,843,426

VEHICLE WHEEL

Takeo Nojima, Ota-ku, Tokyo, Japan, assignor to Amagasaki Seitetsu Kabushiki Kaisha, Amagasaki City, Hyogo Prefecture, Japan Application April 12, 1955, Serial No. 500,923

Claims priority, application Japan September 30, 1954

2 Claims. (Cl. 301—5)

This invention relates to transportation devices, and more particularly to a new kind of wheel device employing a gyration principle of bearings.

My co-pending application Serial No. 500,921, filed April 12, 1955, discloses a gyrating bearing unit comprising a cup-shaped receptacle having a bottom surface and a cylindrical inside surface, a series of relatively small spherical balls arranged in a circle and bearing against said bottom surface and said cylindrical inside surface, and a relatively large spherical ball bearing on said circle of small balls and retained within said receptacle with a portion projecting out of said receptacle.

When a plurality of such bearing units are used to support a moving body with the longitudinal axis of each receptacle inclined at an angle with respect to the direction of the loading force on the larger ball in a plane perpendicular to the direction of movement of the contact point of the moving body with the large ball, a bearing is obtained with extremely minute frictional resistance being as low as 10% or less of that of ordinary ball bearings.

The instant invention utilizes such gyrating bearing units in transportation devices and provides a wheel device with a minimum of frictional resistance and a relatively large area of ground contact.

It is, therefore, an object of the invention to provide a wheel device for transportation purposes with a minimum of frictional resistance so as to facilitate transportation.

Another object of the invention is to provide a wheel device for transportation purposes which is particularly adapted for transportation of heavy loads.

A further object of the invention is to provide a wheel device for transportation purposes having a wheel which contacts the ground or road surface with a large width or area, thus obviating the disadvantage of a narrow width wheel with heavy load which would damage the road surface.

Figure 1:
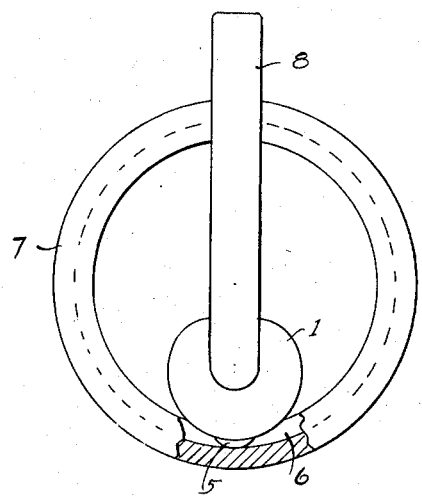
Figure 2:
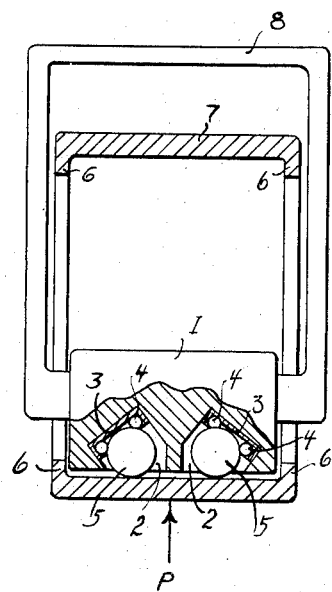

The invention will best be understood from the following detailed description thereof with reference to the accompanying drawings, wherein:

Fig. 1 is a side elevational view, partly in section, of the wheel device of a transportation means embodying the invention, and Fig. 2 shows an elevation taken at right angles to Fig. 1, partly in section.

Referring to the drawings, the device comprises a wheel shaft 1 which is provided at the lower side with a plurality of cylindrical recesses 2 opening downward and disposed in alignment with each other. Each recess is provided with a bottom cup-shaped bearing member 3 in a plane substantially perpendicular to its cylindrical inside surface, and has its longitudinal axis inclined at an angle, for instance 30 degrees, with respect to the direction of the load force P in the vertical plane passing through the contact line of the road with the wheel to be referred to hereinafter.

In each of the recesses 2 are disposed a series of relatively small spherical balls 4 in a circle, said balls bearing against both the bottom surface and the cylindrical inside surface of the member 3. Against each circular row of the balls 4 bears a relatively large spherical ball 5 which partly projects beyond the downward opening of the recess 2.

A hollow wheel cylinder 7, having annular inward flanges 6 at the opposite ends, houses the shaft 1, with the larger ball 5 bearing against the inside cylindrical surface of the wheel 7. The shaft 1 is fixed at its opposite ends to a yoke member 8 which is intended to carry a cage or body of a transportation device, not shown. The yoke 8 straddles over the wheel cylinder 7.

In operation, when the yoke 8 is pulled or pushed in the direction perpendicular to the plane of Fig. 2, the shaft 1 causes the wheel cylinder 7 to revolve along the road surface, the gyrating bearing units (2—4—5) assuring the minimum of frictional resistance as fully disclosed in my co-pending application Serial No. 500,921, mentioned hereinabove. Experiments have shown that, transportation devices embodying the above wheel assembly can readily be driven by a single person with several tons of loads carried thereby.

Inasmuch as the shaft 1 is not required to lie on the axis of revolution of the wheel cylinder 7, any wear of the bearing surface of the cylinder 7 does not affect the proper operation of the wheel. In addition, the wheel cylinder 7 may have any desired axial length within practical limits, and may, consequently, have ample contact area with the road surface. This means that the wheel would have little chance to bite into the road surface, thus enabling extremely heavy loads to be transported easily, in conjunction with the minimum frictional resistance in the bearing units.

I claim as my invention:

1. A wheel device for transportation use on a supporting surface, comprising a yoke member, a shaft carried by said yoke member in fixed relation thereto, a hollow cylindrical wheel member housing said shaft, for rolling contact with said supporting surface, said yoke member straddling and extending above said wheel member, said shaft having a plurality of cylindrical recesses in the underside thereof, a cup-shaped bearing member in the bottom of each recess, each bearing member having a cylindrical inside surface and a bottom surface substantially perpendicular to said cylindrical surface, and each bearing member having its longitudinal axis inclined at an angle with respect to the vertical line in the vertical plane passing through the line of contact of said wheel member with said supporting surface, a series of relatively small spherical balls within each of said cup-shaped bearing members, said relatively small spherical balls being arranged in circles and bearing against both said bottom surface and said cylindrical inside surface of said bearing members and relatively large spherical balls bearing, respectively, against said circular rows of small balls in each of said bearing members, said relatively large balls having portions projecting downwards beyond the openings of said recesses and bearing against the inner cylindrical surface of said wheel member so as to obtain a physical balance of said shaft with respect to said yoke member.

2. A wheel device as claimed in claim 1, wherein said angle of inclination of the longitudinal axis of each of said cup-shaped bearing members is about 30 degrees.

References Cited in the file of this patent

UNITED STATES PATENTS

| 697,735 | Magoun | Apr. 15, 1902 |
| 851,396 | Bode | Apr. 23, 1907 |

FOREIGN PATENTS

| 806,993 | France | Dec. 30, 1936 |